United States Patent [19]

Smith et al.

[11] Patent Number: 5,801,513

[45] Date of Patent: Sep. 1, 1998

[54] APPARATUS FOR CHARGING BATTERIES AND SUPPLYING BACKUP POWER

[75] Inventors: Sybren Daniel Smith, Fox Lake; James D. Palmer, Deerfield; Louis Lundell, Buffalo Grove, all of Ill.

[73] Assignee: Motorola, Inc., Schaumburg, Ill.

[21] Appl. No.: 775,324

[22] Filed: Dec. 31, 1996

[51] Int. Cl.$^6$ .................................................. H02J 7/00
[52] U.S. Cl. ........................ 320/113; 320/112; 320/107; 307/66
[58] Field of Search ........................ 320/2, 5, 6, 15, 320/112, 113, 107; 429/96.1–100; 307/66

[56] References Cited

U.S. PATENT DOCUMENTS

| | | | |
|---|---|---|---|
| 4,323,788 | 4/1982 | Smith . | |
| 4,760,277 | 7/1988 | Vurpillat . | |
| 4,829,224 | 5/1989 | Gandelman et al. | 320/2 |
| 4,884,294 | 11/1989 | Inagami | 379/61 |
| 5,039,929 | 8/1991 | Veistroffer et al. | 320/2 |
| 5,200,685 | 4/1993 | Sakamoto | 320/2 |
| 5,244,411 | 9/1993 | Schinke et al. . | |
| 5,272,459 | 12/1993 | Geery . | |
| 5,306,956 | 4/1994 | Ikeda et al. | 307/66 X |
| 5,327,067 | 7/1994 | Scholder | 320/2 |
| 5,418,445 | 5/1995 | Alpert et al. | 307/66 X |
| 5,420,493 | 5/1995 | Hargadon et al. | 320/15 |
| 5,465,038 | 11/1995 | Regsiter | 320/2 |
| 5,477,123 | 12/1995 | Allen et al. | 320/2 |
| 5,525,888 | 6/1996 | Toya | 320/2 |
| 5,578,875 | 11/1996 | Donner et al. | 307/66 |
| 5,602,455 | 2/1997 | Stephens et al. | 320/2 |
| 5,629,602 | 5/1997 | Makino | 320/6 |
| 5,633,572 | 5/1997 | Steele et al. | 320/107 |

OTHER PUBLICATIONS

U.S. Pending Patent application Serial No. 08/549,993, filed Oct. 26, 1995 for Inventors Steven C. Emmert, Louis J. Lundell, and Michael P. Murray, "Uninterruptible Power Supply," Motorola, Inc., 1996.

*Primary Examiner*—Peter S. Wong
*Assistant Examiner*—K. Shin
*Attorney, Agent, or Firm*—John J. Oskorep

[57] ABSTRACT

An apparatus (100) for an electronic system (106), which includes a portable unit (102) and a base unit (104), supplies backup power to the base unit (104) and is capable of recharging at least one battery (121) that operates the portable unit (102). The apparatus (100) is connected in series between the base unit (104) and a main power supply (148) and includes at least one slot (131) configured to receive the at least one battery (121). When power from the main power supply (148) is available, the apparatus (100) supplies power to the base unit (104) from the main power supply (148) and is capable of recharging the at least one battery (121). When power is not available from the main power supply (148) and the at least one battery (121) is received within the at least one slot (131), the apparatus (100) supplies power to the base unit (104) from the at least one battery (121).

4 Claims, 1 Drawing Sheet

APPARATUS FOR CHARGING BATTERIES AND SUPPLYING BACKUP POWER

FIELD OF THE INVENTION

This invention relates generally to battery chargers and backup supplies, and more particularly to battery chargers and backup supplies for electronic systems having portable units.

BACKGROUND OF THE INVENTION

Backup power supplies for electronic systems such as desktop computers, answering machines, and cordless telephone systems are known in the art. Typically, a backup supply is housed within an electronic system or, alternatively, located physically apart from the electronic system in a "stand-alone" unit. When the backup supply is housed within the electronic system, a housing of the electronic system must accommodate the physical space required by the backup supply, causing the overall size of the electronic system to undesirably increase. When the backup supply is manufactured apart from the electronic system, a user may find it difficult to find desktop or floor space for the additional stand-alone unit.

An electronic system may also require a battery charger for recharging batteries that are used in the electronic system. For example, a base station of a cordless telephone system typically requires a battery charger for recharging batteries of a cordless telephone. When the battery charger is housed within the electronic system, the overall size of the electronic system is undesirably increased in proportion to the number of batteries that can be simultaneously recharged in the system. In addition, the battery charger cannot be used separately from the electronic system if desired. When the battery charger is manufactured apart from the electronic system, a user may find it difficult to find desktop space for the additional stand-alone unit.

For an electronic system that requires both a backup supply and a battery charger, practical design and arrangement of both system features poses even greater difficulty. In addition, many electronic systems that require such features are sold in consumer markets that are very price-sensitive.

Accordingly, there is a resulting need for an apparatus which overcomes the above-noted deficiencies.

DETAILED DESCRIPTION OF THE PREFERRED EMBODIMENTS

According to the present invention, an apparatus for an electronic system, which includes a portable unit and a base unit, supplies backup power to the base unit and is capable of recharging at least one battery that operates the portable unit. The apparatus is connected in series between the base unit and a main power supply and includes at least one slot configured to receive the at least one battery. When power from the main power supply is available, the apparatus supplies power to the base unit from the main power supply and is capable of recharging the at least one battery. When power is not available from the main power supply and the at least one battery is received within the at least one slot, the apparatus supplies power to the base unit from the at least one battery.

Figure 1:
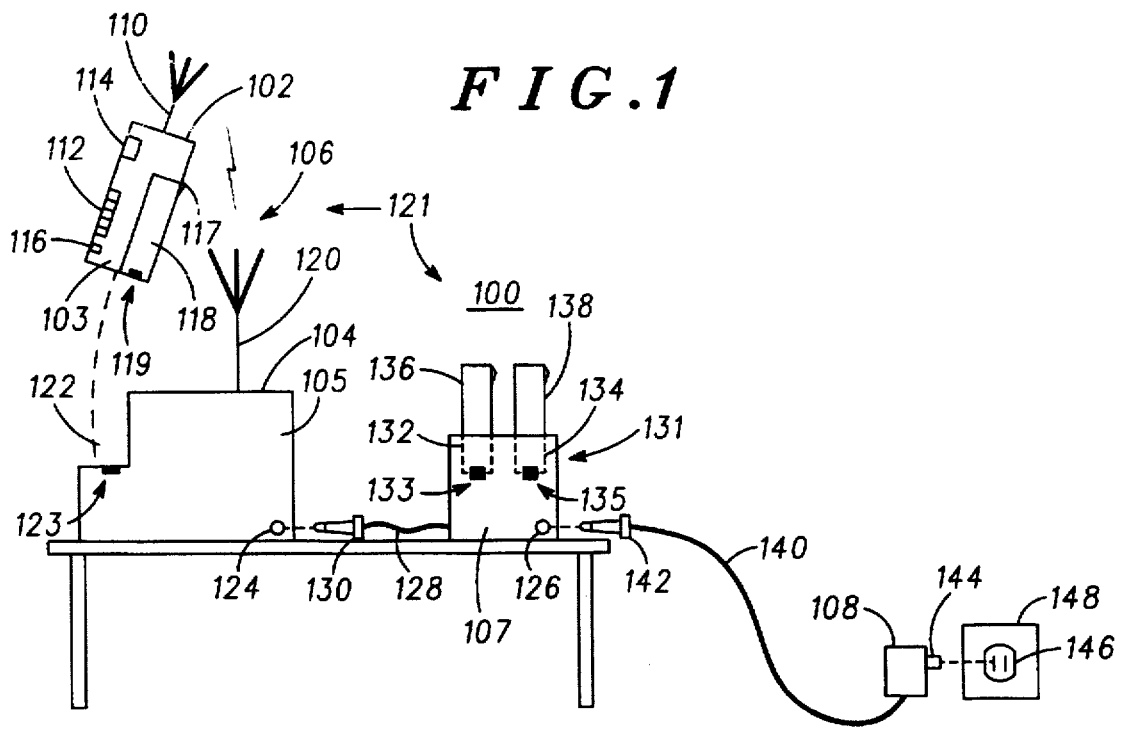
FIG. 1 is a side view illustration of an apparatus in accordance with the present invention, the apparatus being configured for use in an electronic system that includes a base unit and a portable unit.

FIG. 1 is an illustration of an apparatus 100 which is configured for use with an electronic system 106. In the illustrated embodiment, electronic system 106 is a cordless telephone system which includes a portable unit 102, a base unit 104, and a transformer 108. Here, portable unit 102 may be more commonly referred to as a cordless telephone or a mobile station, and base unit 104 may be more commonly referred to as a base station. Portable unit 102 includes a housing 103, an antenna 110, a keypad 112, a speaker 114, and a microphone 116. Base unit 104 includes a housing 105, an antenna 120, a cradle 122 for holding portable unit 102, and a jack 124. Transformer 108 includes a plug 144 and an electrical cord 140 having a plug 142 on its end.

Figure 2:
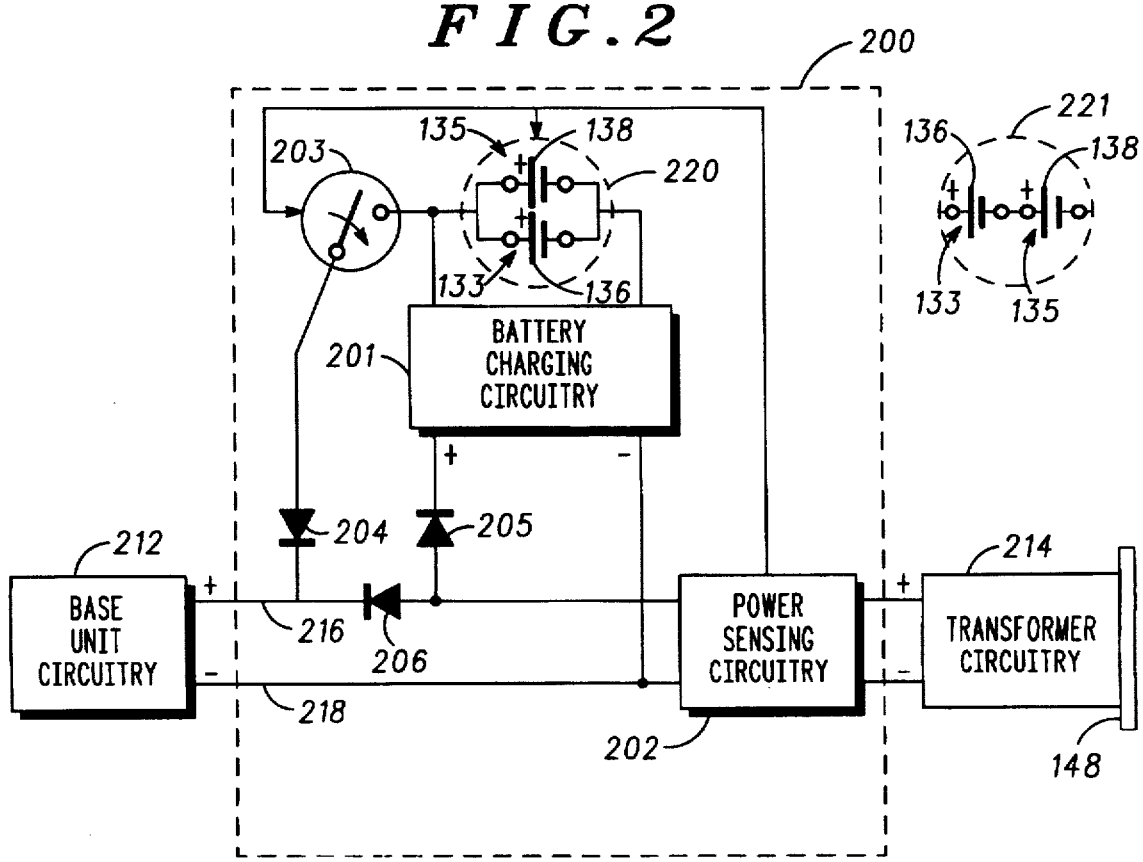
FIG. 2 is a schematic block diagram of electrical circuitry of the apparatus of FIG. 1.

FIG. 1 also shows a main power supply 148, which is an alternating current (AC) source, available through an electrical outlet 146. Portable unit 102 and base unit 104 are both electronic devices having electrical circuitry disposed therein, e.g., base unit 104 includes base unit circuitry 212 (FIG. 2). Without the use of apparatus 100, electronic system 106 is electrically powered by inserting plug 144 into electrical outlet 146 and inserting plug 142 into jack 124, which is basically a power supply input of base unit 104. With this configuration, base unit 104 is powered by main power supply 148 directly through transformer 108. Transformer 108, which includes transformer circuitry 214 (FIG. 2), converts an AC voltage from main power supply 148 to a direct current (DC) voltage required to operate base unit circuitry 212.

Electronic system 106 provides telephone communication for a user thereof. Portable unit 102 is a communication device sized to fit within a user's hand. Keypad 112 is provided for initiating telephone calls, and speaker 114 and microphone 116 are provided for listening and talking during telephone conversations. Base unit 104 is connected to a telephone land line network via a telephone cord (not shown). Portable unit 102 and base unit 104 wirelessly communicate via radio frequency (RF) signals which are generated by the electrical circuitry of portable unit 102 and base unit 104. The RF signals are transmitted and received to and from portable unit 102 and base unit 104 through antennas 110 and 120.

Since portable unit 102 is indeed portable, it requires the use of at least one battery 121 for electrical operation. In the illustrated embodiment, the at least one battery 121 includes a battery 118, shown attached to portable unit 102, and batteries 136 and 138, shown disposed within apparatus 100. Batteries 118, 136, and 138 are rechargeable and designed having the same size, shape, construction, and voltage. Preferably, batteries 118, 136, and 138 each provide a voltage in the range of about 1.2 to 1.5 volts. Batteries 118, 136, and 138 can be separately attached to and removed from portable unit 102. Although portable unit 102 requires only a single battery at a time for operation, batteries 136 and 138 are each useful as a replacement when battery 118 is low or dead. Each of batteries 118, 136, and 138 also includes battery contacts, e.g., battery 118 includes battery contacts 119.

Preferably, each of batteries 118, 136, and 138 actually comprises several rechargeable batteries disposed within a package that is configured for attachment to portable unit 102. With such construction, battery 118 may be more commonly referred to as a "battery pack." Such a battery may include, for example, a latching mechanism 117 for attaching and detaching battery 118 to and from portable unit 102. Such a battery is generally made for exclusive use with portable unit 102 and other units designed similarly or the same as portable unit 102. Preferably, such batteries provide a voltage of about 2.4 volts or greater.

For charging batteries such as battery 118, base unit 104 includes electrical contacts 123 positioned within cradle 122 on an outer surface of housing 105. Base unit circuitry 212 (FIG. 2), which is disposed within housing 105, is electrically coupled to electrical contacts 123. Electronic system 106 is constructed such that, when portable unit 102 is disposed in cradle 122, electrical contacts 123 make physical and electrical contact with battery contacts 119. Thus, when portable unit 102 is disposed in cradle 122 in this fashion, base unit circuitry 212 is capable of recharging battery 118.

Apparatus 100 is an optional unit of electronic system 106 and operates as a combination battery charger and backup supply apparatus therefor. Designed for desktop placement, apparatus 100 includes a jack 126 adapted to accept plug 142 of transformer 108 and an electrical cord 128 having a plug 130 adapted for insertion into jack 124 of base unit 104. Jack 126 and electrical cord 128 are electrical interfaces of apparatus 100. When apparatus 100 is used in conjunction with electronic system 106, base unit 104 is powered through apparatus 100 where plug 144 of transformer 108 is plugged into electrical outlet 146 and plug 142 is plugged into jack 126, and plug 130 of apparatus 100 is plugged into jack 124 of base unit 104. When configured in this manner, electronic system 106 operates similarly to that described above, but with extended battery charging and backup supply capability. Hereinafter, electronic system 106 is assumed to be fully connected and operating with this extended setup using apparatus 100.

Apparatus 100 has at least one slot 131 configured to receive the at least one battery 121. In the illustrated embodiment, apparatus 100 includes slots 132 and 134, both of which are configured to receive batteries 136 and 138. Electrical contacts 133 are disposed within slot 132 on an outer surface of housing 107, and electrical contacts 135 are disposed within slot 134 on the outer surface of housing 107. Electrical contacts 133 and 135 are positioned within slots 132 and 134, respectively, such that when batteries 136 and 138 are positioned therein, physical and electrical contact is made between the electrical contacts of batteries 136 and 138 and electrical contacts 133 and 135, respectively. Separately or together, batteries 136 and 138 can be recharged through apparatus 100 when disposed in slots 132 and 134 as exemplified in FIG. 1. Once removed from portable unit 102, battery 118 can also be inserted into one of slots 132 and 134 and recharged through apparatus 100.

Preferably, as shown in FIG. 1, slots 132 and 134 are configured such that when batteries 136 and 138 are inserted within slots 132 and 134, respectively, first portions of batteries 136 and 138 are retained within slots 132 and 134, respectively, and second portions of batteries 136 and 138 outwardly protrude from slots 132 and 134, respectively. Thus, quick insertion and removal of batteries 136 and 138 is possible. Also preferably, housing 107 is configured to physically attach to base unit 104 in a modular design of electronic system 106. Through such attachment, apparatus 100 may also be designed to electrically connect to base unit 104, thereby eliminating the need for electrical cord 128.

FIG. 2 shows a schematic block diagram of electrical circuitry 200 of apparatus 100. In the illustrated embodiment, apparatus 100 includes battery charging circuitry 201, power sensing circuitry 202, switching circuitry 203, a diode 204, a diode 205, and a diode 206. Power sensing circuitry 202 is coupled to jack 126 (FIG. 1), which is coupled to main power supply 148 through transformer circuitry 214. Power sensing circuitry 202 is also coupled to a positive supply line 216 and a negative supply line 218, and to switching circuitry 203. Positive and negative supply lines 216 and 218 are coupled to conductors within electrical cord 128 (FIG. 1), which are connected to base unit circuitry 212 through plug 130 (FIG. 1).

For recharging batteries 136 and 138, battery charging circuitry 201 is coupled to electrical contacts 133 and 135. As described below, the configuration of electrical contacts 133 and 135 is dependent upon and responsive to signals from power sensing circuitry 202. For receiving electrical power for recharging, battery charging circuitry 201 is coupled to positive and negative supply lines 216 and 218. Here, positive supply line 216 is coupled to the anode of diode 205 and the cathode of diode 205 is coupled to the positive side of electrical contacts 133 and 135 through battery charging circuitry 201. Negative supply line 218 is coupled to the negative side of electrical contacts 133 and 135 through battery charging circuitry 201.

Switching circuitry 203 is coupled to the positive side of electrical contacts 133 and 135 and to positive supply line 216 through diode 204. Here, the anode of diode 204 is coupled to switching circuitry 203 and the cathode of diode 204 is coupled to positive supply line 216. Switching circuitry 203 is responsive to signals from power sensing circuitry 202 and couples the anode of diode 204 to the positive side of electrical contacts 133 when closed.

During the operation of apparatus 100, power sensing circuitry 202 monitors the electrical power provided from main power supply 148. When sufficient power for base unit 104 is available from main power supply 148, batteries 136 and 138 are coupled in parallel as shown by an arrangement 220. Power sensing circuitry 202 allows current from main power supply 148 to flow through positive and negative supply lines 216 and 218. Base unit circuitry 212 uses this current for electrical operation, and battery charging circuitry 201 uses this current to charge batteries 136 and 138 when necessary. No current is drawn from batteries 136 and 138 to positive and negative supply lines 216 and 218 since diode 205 inhibits such flow. No current flows through diode 204 since switching circuitry 203 is open.

Power sensing circuitry 202 detects when sufficient power from main power supply 148 is unavailable. In response to such detection, batteries 136 and 138 are switched in series, as shown by an arrangement 221 which replaces arrangement 220. Switching circuitry 203 is closed to allow batteries 136 and 138 to electrically power base unit circuitry 212 through positive and negative supply lines 216 and 218. Thus, base unit circuitry 212 is provided with a voltage that is equal to the sum of the voltages of batteries 136 and 138. Preferably, base unit 104 has an operating voltage that is less than or equal to the sum of the rated voltages of batteries 136 and 138, but greater than the rated voltage of one of batteries 136 and 138. In the preferred embodiment, base unit 104 has an operating voltage of about 5 volts.

The following example is provided to illustrate the use of apparatus 100 within electronic system 106. A user makes prolonged use of portable unit 102. Portable unit 102 signals a low battery indication from speaker 114, signifying to the user that battery 118 is low. Upon hearing this indication, the user removes battery 118 from the portable unit 102. The user then replaces battery 118 with battery 136, which is fully charged from being within apparatus 100 for a predetermined time period. The user inserts battery 118 into slot 132 for recharging, and battery 118 becomes fully charged after a predetermined time period elapses.

Later, electrical power from main power supply 148 fails. Power sensing circuitry 202 senses that power is unavailable and provides a signal to switching circuitry 203. Electrical contacts 133 and 135 are serially coupled, and batteries 118 and 138 provide the electrical power to operate base unit 104. During this transition, a capacitor at the input of base unit circuitry 212 assists in keeping a steady input voltage for seamless operation of electronic system 104.

During the power outage, the user makes use of electronic system 106, perhaps to make a few emergency telephone calls. Electronic system 106 is operable until battery 136 or batteries 118 and 138 expire. When power from main power supply 148 is once again made available, power sensing circuitry 202 detects this condition and signals switching circuitry 203 to open. Thus, electrical power from main power supply 148 to base unit 104 is reestablished. Batteries 118 and 138, somewhat depleted from use by electronic system 106 during the power outage, are eventually fully recharged through apparatus 100 from main power supply 148.

Preferably, electronic system 106 is designed such that portable unit 102 is also capable of operating without base unit 104. Here, a user may leave his home location for an extended period of time, bringing along portable unit 102 and apparatus 100 for recharging batteries 118, 136, and 138. Fortunately, the user may leave behind base unit 104, which is not needed for operation of portable unit 102 and may have a rather inconveniently large size. In the preferred embodiment, electronic system 106 is a system where portable unit 102 is designed to operate in accordance with both Digital European Cordless Telecommunications (DECT) and Personal Handyphone System (PHS) standards. Basically, this dual-mode capability allows portable unit 102 to be used without base unit 104 when portable unit 102 is operating in accordance with PHS standards. The small size of apparatus 100 makes it ideal for portable use as a battery charger for portable unit 102.

Thus, an apparatus that both recharges batteries and supplies backup power for an electronic system is provided. Since the apparatus combines both features into a single unit, it utilizes less materials and minimizes the physical space consumed such apparatus. Since the apparatus is manufactured separately from the electronic system, the size and cost of a simple, low-tier model of the electronic system is reduced. Since the apparatus is designed for desktop placement and provides quick-remove battery slots, rechargeable batteries are easily accessible for use within the electronic system. Such an apparatus also makes it more convenient to recharge batteries in locations remote from the electronic system.

While particular embodiments of the present invention have been shown and described, modifications may be made. For example, apparatus 100 may have only one charging slot or more than two charging slots to accommodate many more batteries. It is therefore intended in the appended claims to cover all such changes and modifications which fall within the true spirit and scope of the invention.

What is claimed is:

1. An apparatus for charging batteries and supplying backup power for an electronic system, the electronic system including a portable unit configured to receive and operate with a first battery and configured to receive and operate with a second battery, said apparatus comprising:
   a housing, said housing defining a first slot configured to receive the first battery and a second slot configured to receive the second battery, said housing constructed separate and apart from the electronic system;
   a first electrical interface, said first electrical interface carried on said housing and configured for coupling to a main power supply;
   a second electrical interface, said second electrical interface carried on said housing and configured for coupling and conducting electrical energy to the electronic system; and
   electrical circuitry disposed within said housing, said electrical circuitry operative to recharge the first and the second batteries when received on said housing and to provide electrical energy from the main power supply to the electronic system for operation when the electrical energy is available, said electrical circuitry operative to serially couple the first and the second batteries and to provide electrical energy from the first and the second batteries to the electronic system for operation in response to a power failure at the main power supply.

2. An apparatus for charging batteries and supplying backup power for an electronic system, the electronic system including a portable electronic device configured to receive and operate with at least one of a first rechargeable battery and a second rechargeable battery, said apparatus comprising:
   a housing, said housing configured to simultaneously receive the first and the second rechargeable batteries;
   a first electrical interface, said first electrical interface carried on said housing and configured for coupling to a main power supply;
   electrical circuitry disposed in said housing, said electrical circuitry including:
   sensing circuitry, said sensing circuitry coupled to said first electrical interface and operative to detect whether sufficient power from the main power supply is available to operate the electronic system;
   battery charging circuitry, said battery charging circuitry operative to recharge the first and the second rechargeable batteries when sufficient power from the main power supply is available, the first and the second rechargeable batteries being coupled in parallel during the recharge; and
   switching circuitry, said switching circuitry coupled and operative in response to said sensing circuitry, said switching circuitry operative to conduct electrical energy to the electrical system from the main power supply when sufficient power from the main power supply is available, said switching circuitry operative to conduct electrical energy to the electrical system from the first and the second rechargeable batteries in response to sufficient power from the main power supply being unavailable, the first and the second rechargeable batteries being coupled in series during the unavailability.

3. The apparatus according to claim 2, wherein said housing is constructed separate and apart from the electronic system, said apparatus further comprising:
   a second electrical interface, said second electrical interface carried on said housing and configured for coupling to the electronic system.

4. The apparatus according to claim 2, wherein the electronic system and the portable unit include electrical circuitry operative to provide radio frequency (RF) communication therebetween.

* * * * *